(12) United States Patent
Kumagai et al.

(10) Patent No.: US 6,473,714 B1
(45) Date of Patent: Oct. 29, 2002

(54) INCLINATION MEASURING APPARATUS

(75) Inventors: Kaoru Kumagai, Tokyo (JP); Fumio Ohtomo, Tokyo (JP); Masayuki Nishi, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 0 days.

(21) Appl. No.: 09/373,316

(22) Filed: Aug. 12, 1999

(30) Foreign Application Priority Data

Sep. 29, 1998 (JP) .......................................... 10-293104
Mar. 17, 1999 (JP) .......................................... 11-071666

(51) Int. Cl.[7] .................................................. G01C 9/06
(52) U.S. Cl. .................................... 702/150; 356/445
(58) Field of Search ...................... 702/150, 151–159; 356/3, 3.02, 3.03, 3.05, 3.1, 17, 456, 458, 484, 485, 490, 510, 511, 121, 138, 139.02, 152.3, 614, 616, 445

(56) References Cited

U.S. PATENT DOCUMENTS

| | | | | |
|---|---|---|---|---|
| 5,392,112 A | * | 2/1995 | Nakamura | ................ 356/139.1 |
| 5,392,115 A | * | 2/1995 | Oshida et al. | ................ 356/349 |
| 5,995,233 A | * | 11/1999 | Ohtomo et al. | ............. 356/400 |
| 6,088,090 A | * | 7/2000 | Hoshi et al. | ............. 356/139.1 |
| 6,204,498 B1 | * | 2/2001 | Kumagai et al. | ........ 250/222.1 |

* cited by examiner

*Primary Examiner*—Hal Wachsman
*Assistant Examiner*—Edward Raymond
(74) *Attorney, Agent, or Firm*—BakerBotts LLP

(57) ABSTRACT

An object of the present invention is to provide an inclination setting rotational laser apparatus and so on for use with a laser surveying instrument. According to the present invention, there is provided an arrangement in which a laser projector projects a laser beam, tilting means tilts the laser projector in at least one direction, a first optical system of inclination detecting means directs the light from a light source toward a liquid member having a free surface, light receiving means receives the light reflected on the liquid member, a second optical system guides the light reflected on the liquid member to the light receiving means, and arithmetic operation means calculates the inclination based on the received signal of the light receiving means, whereby the laser projector can be settled to have an inclination by driving the tilting means based on the inclination.

13 Claims, 14 Drawing Sheets

20000

INCLINATION MEASURING APPARATUS

BACKGROUND OF THE INVENTION

1. Field of the Invention

The present invention relates to an inclination setting rotational laser apparatus for use in a laser surveying instrument in which a laser light beam can be projected with a tilt angle with respect to a level plane.

2. Description of the Related Art.

There has been available a rotational laser apparatus such as shown in Japanese Patent Laid-Open gazette No. 6-26861, for example. According to the rotational laser apparatus, as shown in FIG. 12, a laser beam can be projected rotationally so as to form a laser reference plane. Further, the arrangement shown in the figure allows the laser reference plane to be tilted.

That is, a laser projector 10 is disposed at substantially the center of a casing 5, and a rotational scanning unit 13 is provided above the laser projector 10. The rotational scanning unit 13 is arranged to be rotatable in the horizontal direction by means of a scanning motor 15 through gears. A pentaprism 18 is provided in the rotational scanning unit 13, so that the laser light beam irradiated on the rotational axis of the rotational scanning unit 13 is polarized by 90 degrees to form the laser reference plane.

The laser projector 12 and the rotational scanning unit 13 are arranged to be tilted in two directions perpendicular to each other. The laser projector 12 is provided with a first inclination sensor 20 and a second inclination sensor 21. The first inclination sensor 20 and the second inclination sensor 21 are disposed so as to intersect each other at right angles.

Further, the laser projector 12 is provided with a first setting inclination sensor 65 and a second setting inclination sensor 66. The inclination directions of the first setting inclination sensor 65 and the second setting inclination sensor 66 are made to agree with the two directions perpendicular to each other in which the first inclination sensor 20 and the second inclination sensor 21 extend, respectively. Thus, the laser projector 12 can be inclined with respect to the position determined by the first setting inclination sensor 65 and the second setting inclination sensor 66.

The first setting inclination sensor 65 and the second setting inclination sensor 66 are provided on a base plate and the inclination angle can be arbitrarily set by means of a first arbitrary angle setting unit 52 and a second arbitrary angle setting unit 53 (not shown).

The first arbitrary angle setting unit 52 and the second arbitrary angle setting unit 53 are arranged to be driven by a first tilting motor 58 and a second tilting motor 59 (not shown) through a gear.

The casing 5 is provided with a first inclination setting unit 35 and a second inclination setting unit 36 (not shown). The first inclination setting unit 35 and the second inclination setting unit 36 are utilized to incline the laser projector 12 and the rotational scanning unit 13 so that the directions of the first inclination sensor 20 and the second inclination sensor 21 are perpendicular to each other.

The first inclination setting unit 35 and the second inclination setting unit 36 are driven by a first inclination adjusting motor 31 and a second inclination adjusting motor 32 (not shown) through a gear.

The laser projector 12 has a first arm 25 and a second arm 26 (not shown) extending therefrom in a direction perpendicular to the laser projector 12 The first arm 25 and the second arm 26 are engaged with the first inclination setting unit 35 and the second inclination setting unit 36, respectively.

When an inclination is set in the apparatus, the laser reference plane is made to agree with the horizontal plane for setting the reference position. The tilting mechanism corresponds to tilting means.

When the horizontal plane is set in the apparatus, the horizontal position is detected by the first inclination sensor 20 and the second inclination sensor 21. At this time, the rotational axis of the rotational scanning unit 13 is made vertical and the first setting inclination sensor 65 and the second setting inclination sensor 66 are made horizontal.

Then, the first arbitrary angle setting unit 52 and the second arbitrary angle setting unit 53 are driven based on the tilting angle inputted through inputting device so that the first setting inclination sensor 65 and the second setting inclination sensor 66 are inclined in the negative direction with respect to a predetermined inclination angle.

After the first setting inclination sensor 65 and the second setting inclination sensor 66 are inclined in the negative direction, the first inclination setting unit 35 and the second inclination setting unit 36 are driven until the first setting inclination sensor 65 and the second setting inclination sensor 66 indicate the horizontal state with their output signals, whereby the laser projector 12 and the rotational scanning unit 13 are inclined. When the first setting inclination sensor 65 and the second setting inclination sensor 66 indicate the horizontal state with their output signals, the inclination setting operation is completed.

FIG. 13 is a diagram showing a control block for controlling the apparatus.

The first fixed bubble tube 20 and the first arbitrary angle setting bubble tube 65 supply detection results through a first switching circuit 85 to a first angle detecting circuit 87 while the second fixed bubble tube 21 and the second arbitrary angle setting bubble tube 66 supply detection results through a second switching circuit 86 to a second angle detecting circuit 88.

The first angle detecting circuit 87 and the second angle detecting circuit 88 have a reference angle 91 and a reference angle 92 set therein, respectively. The reference angle 91 and the reference angle 92 are set to zero in the ordinary state.

When the first angle detecting circuit 87 is supplied with a signal from the first fixed bubble tube 20 through the first switching circuit 85, the first angle detecting circuit 87 detects a deviation amount relative to the reference angle 91. Then, the first angle detecting circuit 87 supplies a signal to a first motor controller 89 and a first level adjusting motor 31 is controlled by the first motor controller 89.

When the first angle detecting circuit 87 is supplied with signals from the first fixed bubble tube 20 and the arbitrary angle setting bubble tube 65 through the first switching circuit 85, the first angle detecting circuit 87 generates a signal corresponding to the deviation amount. Then, the signal indicative of the deviation amount is supplied to a first inclination drive circuit 83, and a first drive motor 58 is controlled in its drive by the first inclination drive circuit 83. Further, when the second angle detecting circuit 88 is supplied with a signal from the second arbitrary angle setting bubble tube 66 through the second switching circuit 86, the second angle detecting circuit 88 detects a deviation amount relative to the reference angle 92. Then, the second angle detecting circuit 88 supplies a signal to a second motor controller 90 and a second level adjusting motor 32 is controlled by the second motor controller 90.

The signal of the second angle detecting circuit 88 is supplied to the second motor controller 90, and the second level adjusting motor 32 is controlled in its drive by the second motor controller 90. Then, the signal of the second angle detecting circuit 88 and the signal of an arbitrary angle setting circuit 82 are supplied to a second inclination drive circuit 84, and a second drive motor 59 is controlled in its drive by the second inclination drive circuit 84.

Then, the angle deviations generated from the first angle detecting circuit 87 and the second angle detecting circuit 88 are supplied to a discriminator 93. The discriminator 93 selects the larger angle deviation from the angle deviations of the first angle detecting circuit 87 and the second angle detecting circuit 88, and supplies an output corresponding to the selected angle deviation change to a display driver 94. The display driver 94 makes a display 95 display corresponding to the value of the deviation.

According to the present embodiment, the reference plane formed by the laser beam can be set horizontal or inclined by an arbitrary angle. Now, the leveling operation of the laser surveying instrument for forming the horizontal reference plane will be described.

If a main unit 4 is installed and no adjustment is carried out, the axis of the laser projector 10 does not coincide with the vertical line in general, and hence the first fixed bubble tube 20 and the second fixed bubble tube 21 are not horizontal.

The first switching circuit 85 establishes a signal line from the first fixed bubble tube 20 to the first angle detecting circuit 87 while the second switching circuit 86 establishes a signal line from the second fixed bubble tube 21 to the second angle detecting circuit 88.

If the reference angle 91 is set to zero, the first angle detecting circuit 87 generates an angle deviation signal while if the reference angle 92 is set to zero, the second angle detecting circuit 88 generates another angle deviation signal. When the angle deviation signal is generated, the first motor controller 89 and the second motor controller 90 drive the first level adjusting motor 31 and the second level adjusting motor 32 in a predetermined direction so that the angle deviation signal becomes zero.

The laser plane formed by the rotational laser apparatus is required to have a high inclination precision because the laser plane serves as a reference plane. A pendulum type inclination detecting apparatus can detect the inclination angle at relatively wide detection range. However, the pendulum type inclination detecting apparatus includes a mechanical drive portion and therefore the detection precision is influenced from the frictional drag and it is very difficult to detect an angle in unit of several seconds.

As a conventional element for detecting the inclination of a surveying instrument, an electric type bubble tube 10000 as shown in FIG. 14 has been utilized.

The bubble tube 10000 has a bubble 5000 enclosed therein and electrodes 6000 and 7000 formed thereon so that the electrostatic capacitance can be measured in an electric manner to determine the inclination of the apparatus.

The electric type bubble tube 10000 is formed of a hollow glass tube and liquid and the bubble 5000 are enclosed therein. The electrodes 6000 and 7000 are formed on the outside of the glass tube and there is no mechanical drive portion, so that the electrostatic capacitance can be detected precisely by using the shifting motion of the bubble.

When inclination is detected precisely by using the bubble tube system, it is requested that the glass tube has a large radius of curvature. However, the bubble tube of a glass tube having a large radius of curvature offers only a small detection range and moreover is expensive.

Further, the bubble tube of a glass tube having a large radius of curvature offers only a narrow dynamic range for detecting the electrostatic capacitance, which limits the detection range to only around horizontal. Therefore, in order to settle an inclination with high precision, it is necessary to employ a fixed sensor and a setting inclination sensor. Further, if it is requested to detect inclination in two directions, four inclination sensors are necessary.

Furthermore, an arbitrary angle setting unit comes to have a complicated structure, serious problems are expected that error is caused from abrasion or error in motion is caused from friction.

SUMMARY OF THE INVENTION

According to the present invention, there is provided an arrangement in which a laser projector projects a laser beam, tilting means tilts the laser projector in at least one direction, a first optical system of inclination detecting means directs the light from a light source toward a liquid member having a free surface, light receiving means receives the light reflected on the liquid member, a second optical system guides the light reflected on the liquid member to the light receiving means, and arithmetic operation means calculates the inclination based on the received signal of the light receiving means, whereby the laser projector can be settled to have an inclination by driving the tilting means based on the inclination.

Further objects and advantages of the present invention will be apparent from the following description which is given with reference to the accompanying drawings wherein preferred embodiments of the present invention is clearly shown.

BRIEF DESCRIPTION OF THE DRAWINGS

The following drawings from FIGS. 1 to 12 show an embodiment of the present invention while FIGS. 12 to 14 show a prior art technology, in which:

FIG. 12 is a diagram useful for explaining a prior art technology;

FIG. 13 is another diagram useful for explaining a prior art technology; and

FIG. 14 is a further diagram useful for explaining a prior art technology.

DESCRIPTION OF THE PREFERRED EMBODIMENTS

An embodiment of the present invention will hereinafter be described with reference to the drawings.

Initially, an inclination sensor 1000 employed in an inclination setting rotational laser apparatus 5000 according to the present embodiment will be described. The inclination sensor 1000 corresponds to inclination detecting means and is equivalent to a position measuring apparatus.

Figure 1:
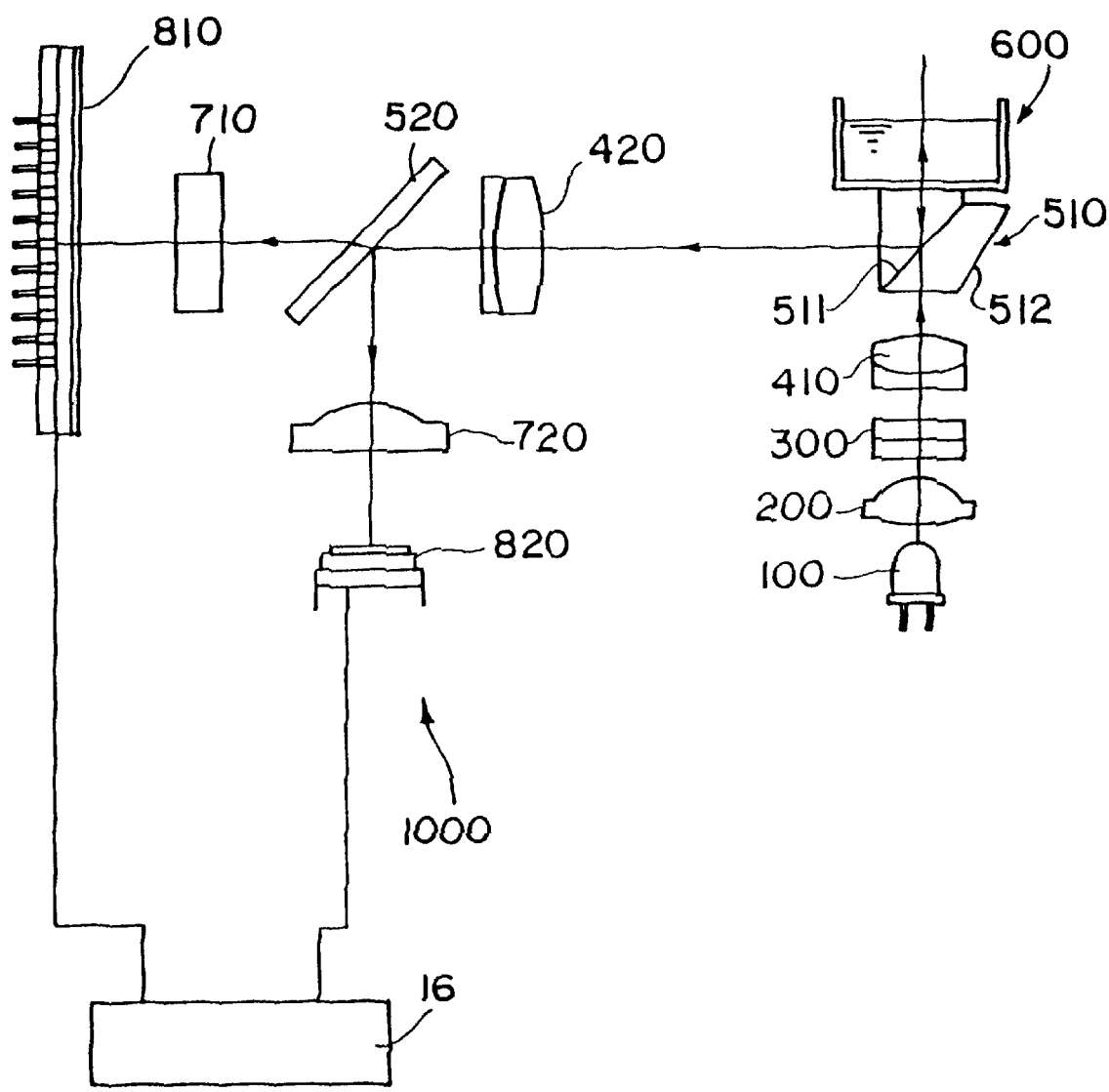
FIG. 1 is a diagram showing an arrangement of an inclination sensor according to an embodiment of the present invention.

FIG. 1 is a diagram showing an optical arrangement of the inclination sensor 1000 according to a first embodiment of the present invention. The inclination sensor 1000 is composed of a light source 100, a condenser lens 200, a dark-field pattern 300, a first pattern relay lens 410, a first half mirror 510, a liquid member 600 having a free surface, a second pattern relay lens 420, a second half mirror 520, a first cylindrical lens 710, a second cylindrical lens 720, a first light receiving element 810, a second light receiving element 820, and arithmetic operation means 16.

Although the light source 100 of the first embodiment is formed of an LED, any kind of light source can be utilized.

The condenser lens 200 is utilized for making the light from the light source 100 parallel and corresponds to a first optical system.

The dark-field pattern 300 is utilized for forming a pattern image on the first light receiving element 810 and the second light receiving element 820. The dark-field pattern 300 corresponds to a pattern.

Figure 2:
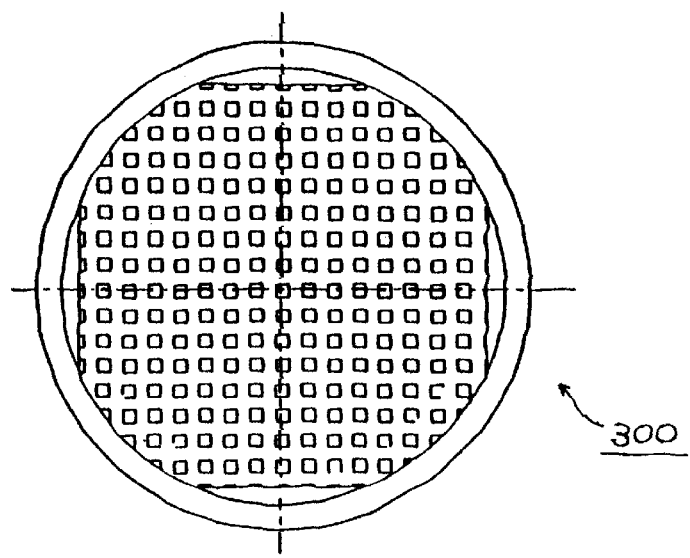
FIG. 2 is a diagram useful for explaining a dark-field pattern according to the embodiment.

FIG. 2 is a diagram showing the dark-field pattern 300 according to the first embodiment in which a two-dimensional array is formed. As shown in FIG. 2, the dark-field pattern 300 is formed of a black mask portion and a plurality of transparent pattern portions provided in the black mask portion. The pattern may be formed of a transparent ground portion and a plurality of black pattern portions provided in the transparent ground portion.

Figure 3:
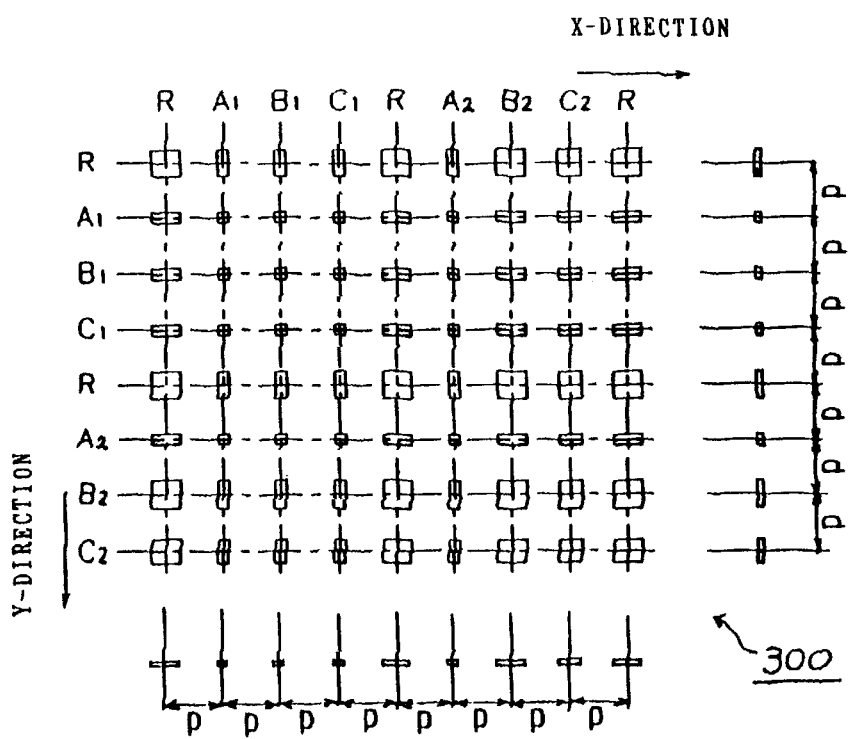
FIG. 3 is another diagram useful for explaining the dark-field pattern according to the embodiment.

FIG. 3 is a magnified view of the plurality of transparent pattern portions of the dark-field pattern 300 of the first embodiment. As shown in FIG. 3, the pattern portions are arrayed in the X-axis direction and the Y-axis direction perpendicular to each other. That is, the dark-field pattern 300 of the first embodiment is an absolute pattern in which an absolute position is indicated by two axes (X-axis and Y-axis) and the pattern extends in the directions of X-axis and Y-axis.

Now columns arrayed in the X-axis direction are numbered with i (i=1 to N) while rows arrayed in the Y-axis direction are numbered with j (j=1 to K), and a particular pattern element is depicted with $P_{ij}$ (i=1 to N, j=1 to K). In the example shown in FIG. 3, N=9 and K=8.

The arrangement of pattern extending in the first row (j=1) will be described.

The pattern of the first row is formed of a first pattern A, a second pattern B, a third pattern C and a fourth pattern R, each of which is repeatedly arrayed at a regular interval (p). That is, a set of patterns, or a block formed of the four kinds of pattern is serially formed. The block disposed at the leftmost side is defined as 1-block and each of patterns forming the block is noted as follows: R, A(1), B(1), C(1). According to the notation, the following patterns repeatedly arranged can be noted as follows: R, A(2), B(2), C(2), R, A(3), B(3), C(3) . . .

That is, the following correspondence is established: $P_{11}=R$, $P_{21}=A_1$, $P_{31}=B_1$, $P_{41}=C_1$, $P_{51}=R$, $P_{61}=A_2$, $P_{71}=B_2$, $P_{81}=C_2$, $P_{91}=R$.

The arrangement of pattern extending in the first column (i=1) will be described.

The pattern of the first column is formed of a first pattern A, a second pattern B, a third pattern C and a fourth pattern R, each of which is repeatedly arrayed at a regular interval (p). That is, a set of patterns, or a block formed of the four kinds of pattern is serially formed. The block disposed at the uppermost side is defined as 1-block and each of patterns forming the block is noted as follows: R, A(1), B(1), C(1). According to the notation, the following patterns repeatedly arranged can be noted as follows: R, A(2), B(2), C(2), R, A(3), B(3), C(3) . . .

That is, the following correspondence is established: $P_{11}=R$, $P_{12}=A_1$, $P_{13}=B_1$, $P_{14}=C_1$, $P_{15}R$, $P_{16}=A_2$, $P_{17}=B_2$, $P_{18}=C_2$.

The first pattern relay lens 410 is utilized for guiding the light beam passing through the dark-field pattern to the first half mirror 510.

The first half mirror 510 of the present first embodiment is a beam splitter having a semitransparent surface 511. The light beam incident on the first half mirror 510 is directed upward through the semitransparent surface 511 and then incident on the liquid member 600 having a free surface. The light beam reflected on the liquid member 600 having a free surface is reflected on the semitransparent surface 511 of the first half mirror 510 and directed toward the second pattern relay lens 420.

The first half mirror 510 is arranged to have a slant surface 512 inclined with respect to the reflected light beam from the light source 100.

This is because the light beam incident on the first half mirror 510 from the light source 100 is directed upward through the semitransparent surface 511 but a part of the light beam is reflected on the semitransparent surface 511. If the part of the light beam reflected on the surface is reflected on the end surface of the first half mirror 510 and then travels the same optical path in the opposite direction, then the light beam will pass through the semitransparent surface 511 again to be directed to the second pattern relay lens 420.

The reflected light beam reflected on the semitransparent surface 511 can hinder the inclination detection, causing error. Thus, according to the first embodiment, the end surface of the first half mirror 510 is arranged to be the slant surface 512 inclined relative to the light beam passing therethrough from the light source 100.

As a result, although the light beam reflected on the semitransparent surface 511 from the light source 100 is reflected again on the slant surface 512, the reflected light beam again reflected on the slant surface 512 will never travel the same optical path in the opposite direction. Therefore, the reflected light will not incident on the first light receiving element 810 and the second light receiving element 820 through the second pattern relay lens 420. Accordingly, measurement with high precision can be carried out.

The light source 100 and the surface of the liquid member 600 having a free surface for reflecting the light beam from the light source 100 may be placed in a conjugate relationship.

In this case, the reflecting area of the liquid member 600 becomes the smallest, with the result that the error caused from the surface tension can be made smallest. Moreover, the volume of the liquid member 600 can be made small.

The liquid member 600 having the free surface is filled with a liquid having a proper viscosity such as a silicon oil. Since the liquid member 600 has the free surface, the surface is always maintained to be a level surface.

Further, the liquid member 600 of the present embodiment may be integrally formed with the first half mirror 510.

The first half mirror 510 of the present embodiment may be provided with a reflection preventing film on a surface contacting to the liquid member 600.

The liquid member 600 and the first half mirror 510 of the present embodiment may be arranged to have a refractive index similar to each other.

The first half mirror 510 corresponds to a half mirror.

A light beam reflected on the liquid member 600 having the free surface and also reflected on the first half mirror 510 passes through the second pattern relay lens 420 so that the pattern image is formed on the first light receiving element 810 and the second light receiving element 820. That is, the second pattern relay lens 420 is utilized for forming the image of the dark-field pattern 300 on the first light receiving element 810 and the second light receiving element 820.

The second pattern relay lens 420 corresponds to the second optical system, and disposed at a position distant from the first light receiving element 810 and the second light receiving element 820 by a focal distance, f of the pattern relay lens 420.

The second half mirror 520 is utilized for splitting the light beam of the image of the dark-field pattern 300 into a light beam for the first light receiving element 810 and the second light receiving element 820.

The first cylindrical lens 710 is utilized for condensing the light beam of the image of the dark-field pattern 300 in the X-axis direction. The first cylindrical lens 710 corresponds to the first optical element.

For example, the first cylindrical lens 710 condenses the light beam of the pattern of $P_{11}=R$, $P_{21}=A_1$, $P_{31}=B_1$, $P_{41}=C_1$, $P_{51}=R$, $P_{61}=A_2$, $P_{71}=B_2$, $P_{81}=C_2$, $P_{91}=R$ for the first row as shown in the right corner of FIG. 3.

That is, $P_{i1}$ (i=1 to 9) is condensed as shown in the right corner of FIG. 3.

Thus, the light beams corresponding to the patterns of all rows can be condensed in the X-direction.

Accordingly, the light beams corresponding to $P_{i1}$ (i=1 to 9) can be condensed throughout the rows of J=1 to 8.

As a result, an absolute pattern indicative of a position in the Y-direction condensed in the X-direction at an interval of p is formed as shown in the right corner of FIG. 3.

The second cylindrical lens 720 is utilized for condensing the light beam of the image of the dark-field pattern 300 in the Y-axis direction. The second cylindrical lens 720 corresponds to the second optical element.

Thus, the light beams corresponding to the patterns of all columns can be condensed in the y-direction, similarly to the X-direction.

The first light receiving element 810 and the second light receiving element 820 according to the present first embodiment employ a CCD (Charge Coupled Device) linear sensor.

The arithmetic operation means 16 is an arithmetic operation unit including a CPU. The arithmetic operation unit 16 controls the overall arrangement of the apparatus and calculates the position of the slit image of the dark-field pattern 300 and also calculates the corresponding tilting angle.

According to the present first embodiment arranged as described above, when the inclination sensor 1000 is inclined, since the free surface of the liquid member 600 is kept horizontal, the image of the dark-field pattern 300 is moved on the first light receiving element 810 and the second light receiving element 820 in proportion to the inclination angle.

Figure 4:
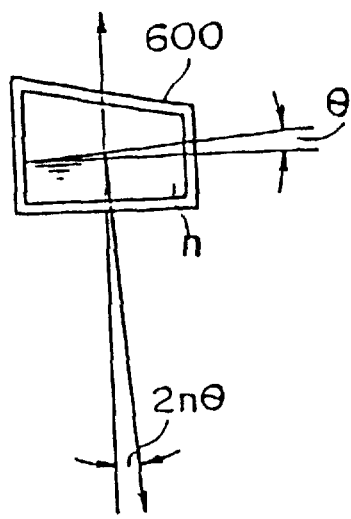
FIG. 4 is a diagram useful for explaining a liquid member according to the embodiment.
Figure 14:
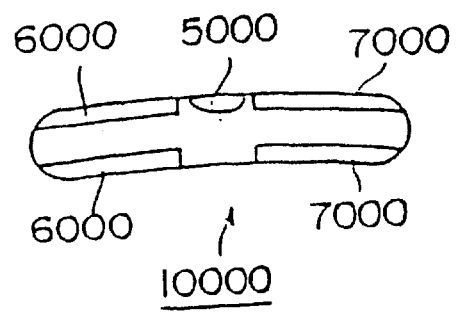

In this case, if the inclination sensor 1000 is inclined by an angle of θ, as shown in FIG. 4, if n is taken as the refractive index of the liquid member 600, the inclination of the light beam reflected from the free surface is given as 2nθ. If L is taken as the distance on the linear sensor, or the first light receiving element 810 and the second light receiving element 820, the distance can be expressed by the following equation:

$$L=f*\tan(2n\theta) \qquad \text{(Equation 1)}$$

Therefore, if the position of the image of the dark-field pattern 300 is detected by the first light receiving element 810 and the second light receiving element 820, the distance of the position with respect to a reference position is calculated, and the arithmetic operation means 16 calculates the inclination angle, then it is possible to measure the inclination angle θ of the inclination sensor 1000.

The arithmetic operation for calculating the inclination angle carried out by the arithmetic operation means 16 will hereinafter be described in detail.

As for the inclination angle, a position of a particular pattern is utilized as a reference, and then a distance dL of a pattern detected by the linear sensor with respect to the particular pattern may be measured.

Further, if the distance between the particular pattern and the detected pattern is smaller than the pitch interval, the outputs of the first light receiving element 810 and the second light receiving element 820 are subjected to Fourier transform to calculate a phase difference Φ of the pitch distance p with respect to the reference position on the linear sensor. Then, a value expressed by the following equation is to be calculated.

$$\Phi*p*m/(2\pi) \qquad \text{(Equation 2)}$$

where m represents magnification. Thus, it is possible to measure the distance smaller than the pitch interval with high precision. Accordingly, if the detection on the distance smaller than the pitch interval is combined with the detection on the distance larger than the pitch interval, the whole distance can be calculated.

Figure 5:
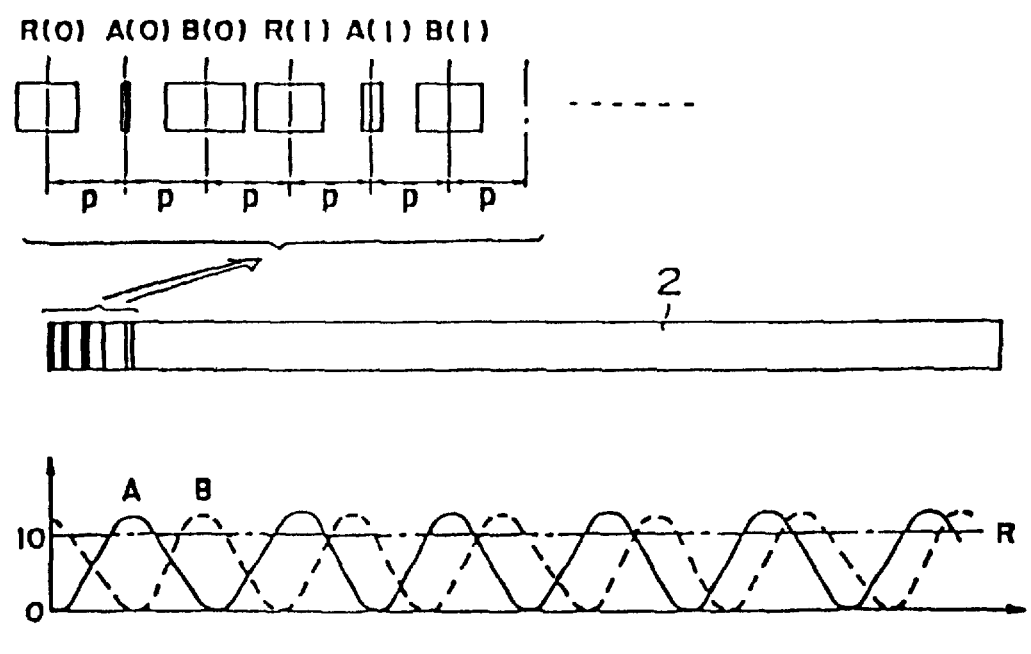
FIG. 5 is a diagram useful for explaining a principle of measurement.

In order to simplify the explanation, the pattern formed in the dark-field pattern 300 is simplified as shown in FIG. 5 and explanation will be made on the simplified pattern. In the explanation, the pattern C is omitted for easy understanding. That is, the following explanation will be made on a pattern composed of a repetitive arrangement of R, A(0), B(0), R, A(1), B(1), R, A(2), B(2), . . .

The pattern formed in the dark-field pattern 300 is, as shown in FIG. 5, the first pattern A, the second pattern B and the third pattern R are each of which is repeatedly arrayed at a regular interval (p). That is, a set of three patterns, or one block is repeatedly provided. If the block provided at the leftmost side is defined as 0-block, and patterns forming the 0-block are denoted as R(0), A(0), B(0), then the following patterns can be denoted as R(1), A(1), B(1), R(2), A(2), B(2), ..., and these notations are repeatedly utilized. since all patterns are repeatedly arrayed at a regular interval p, the signal corresponding to the interval is defined as a reference signal.

For example, the third pattern R is arranged to have a black portion of which width is fixed to 50 µm. The first pattern A is arranged to have a black portion of which width is modulated at a cycle of 7 blocks. The second pattern B is arranged to have a black portion of which width is modulated at a cycle of 5 blocks.

Since the first pattern A is arranged to have a black portion of which width is modulated at a cycle of 7 blocks, if the modulated width is 20 µm to 80 µm, the width $D_A$ of the first pattern is given by the following equation:

$$D_A = 50 + 30 * SIN(2*\pi*X/7) \quad \text{(Equation 3)}$$

where X=(0, 1, 2, 3 . . .

Similarly, since the second pattern B is arranged to have a black portion of which width is modulated at a cycle of 5 blocks, the width $D_B$ of the second pattern is given by the following equation:

$$D_B = 50 + 30 * SIN(2*\pi*X/5) \quad \text{(Equation 4)}$$

where X=(0, 1, 2, 3 . . . )

Since the first pattern A and the second pattern B have the slightly different cycles, the same pattern will repeatedly appear at a distance which corresponds to the least common multiple of both the cycles. According to the present embodiment, the same pattern will appear at every 35 blocks that is the least common multiple of 7 blocks and 5 blocks.

That is, if the number of phase of the first pattern A at a block containing a horizontal position is denoted with $\Phi_A$ (0 to 6) and the number of phase of the second pattern B at a block containing a horizontal position is denoted with $\Phi_B$ (0 to 4), the position H of the dark-field pattern 300 can be expressed by combining the phase numbers $\Phi_A$ and $\Phi_B$ by the following equation:

$$H = \Phi_{AB} * p * m \quad \text{(Equation 5)}$$

where $\Phi_{AB}$ is a block number containing each of the phase numbers.

A method for calculating the position of the dark-field pattern 300 will hereinafter be described concretely.

Figure 6:
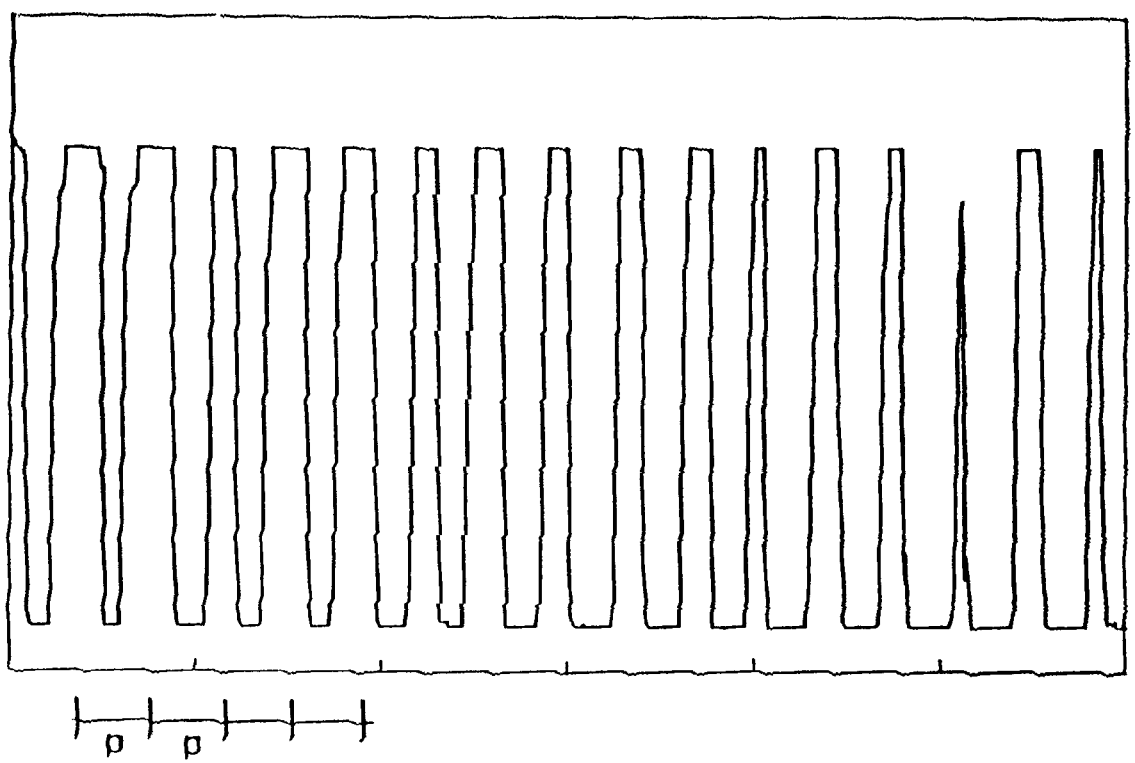
FIG. 6 is another diagram useful for explaining the principle of measurement.
Figure 7:
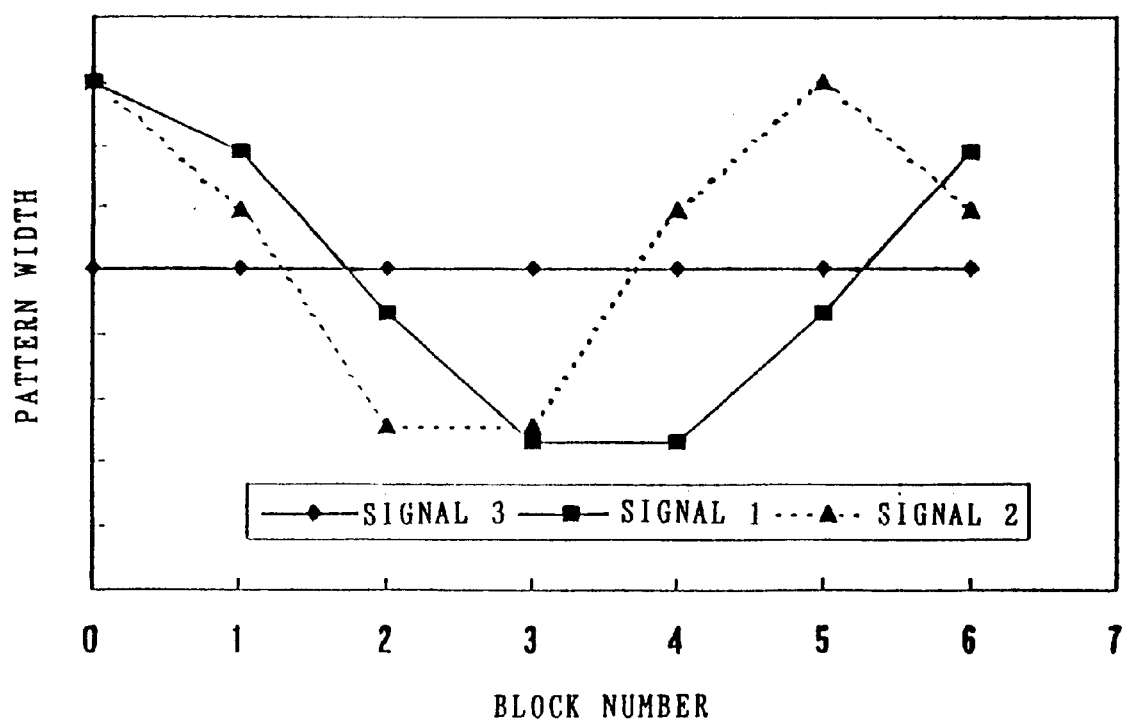
FIG. 7 is a further diagram useful for explaining the principle of measurement.

The width of the pattern is calculated within a range of a front half and rear half pitch amounts of the reference signal (signal corresponding to the regular interval pitch (p)) over the output signals of the first light receiving element 810 and the second light receiving element 820. If the pattern width is decimated at every three pattern elements (product detection), as shown in FIGS. 6 and 7, there are obtained a signal 1 corresponding to the first pattern A, a signal 2 corresponding to the second pattern B, a signal 3 corresponding to the third pattern R. However, the third pattern R is not modulated. In addition, although the first pattern A and the second pattern B have the largest modulation width of 80 µm, the third pattern R has the modulation width of 50 µm. Therefore, the signal 3 corresponding to the third pattern R has a substantially constant width and its value is about 50% those of the signal 1 and signal 2.

Since the third pattern R, the first pattern A and the second pattern B are repeatedly arrayed on the basis of a predetermined sequence, it is possible to determine which pattern is decimated out of the third pattern R, the first pattern A and the second pattern B.

Then, if a set of signals of patterns A and B containing an address position (mth bit) on the linear sensors 810, 820 is selected as a reference position for reading inclination, and calculate the phase number of the pattern A and B, then it becomes possible to determine which position of the combination of the first pattern A and the second pattern B and the third pattern R.

In this case, the phase number of the signal of pattern A is denoted with Am and the phase number of the signal of pattern B is denoted with Bm. Then, the block number $\Phi_{AB}$ containing the patterns R, A and B can be obtained by combining the phase numbers of pattern A and B.

The pattern containing the reference position (mth bit) can be expressed as follows:

In case of pattern R; . . . $3*p*101_{AB}$ (Equation 6)

In case of pattern A; . . . $p*(3*101_{AB}+1)$ (Equation 7)

In case of pattern B; . . . $p*(3*\Phi_{AB}+2)$ (Equation 8)

where p represents the pitch interval.

If the values obtained by Equations 6 to 8 and the value obtained by Equation 2 are combined together, there is obtained the position H of the dark-field pattern 300.

If the condensing cylindrical lens is replaced with a cylindrical lens diverging the pattern, the position of the dark-field pattern 300 also can be obtained.

Figure 8:
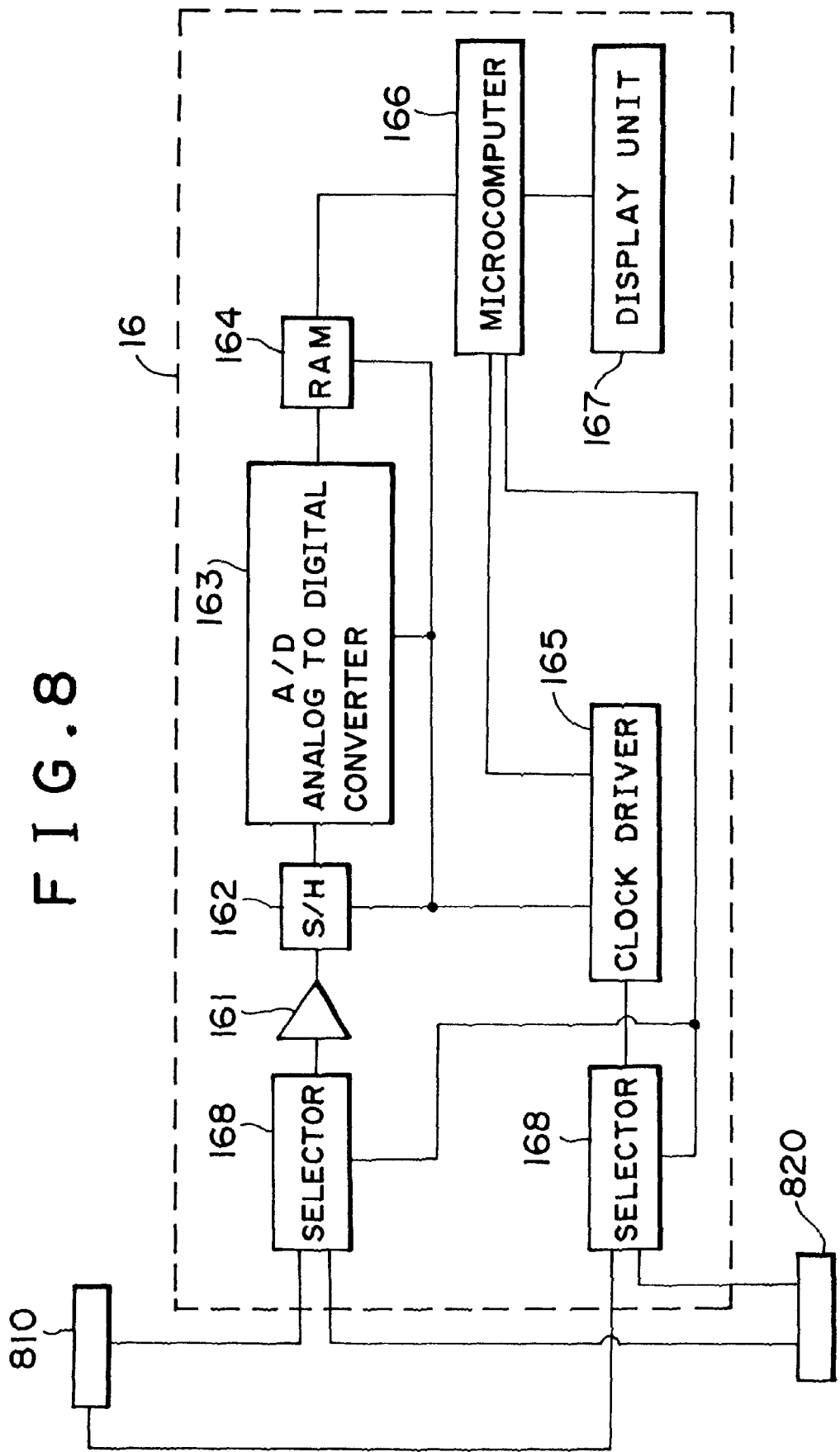
FIG. 8 is a diagram showing an arrangement of arithmetic operation means according to the present embodiment.

The arithmetic operation means 16 of the present embodiment will hereinafter be described in detail with reference to FIG. 8.

An amplifier 161 is utilized for amplifying an electric signal supplied from either of the first light receiving element 810 and the second light receiving element 820 selected by a selector 168. A sample-and-hold circuit 162 is utilized for sample and hold the amplified electric signal with a timing signal supplied from a clock driver 165. An analog-to-digital converter 163 is utilized for converting an analog signal, or the electric signal sampled and held into a digital signal. A RAM 164 is utilized for memorizing the digital signal converted by the analog-to-digital converter 163. Further, a microcomputer 166 carries out various kinds of arithmetic operations.

Figure 9:
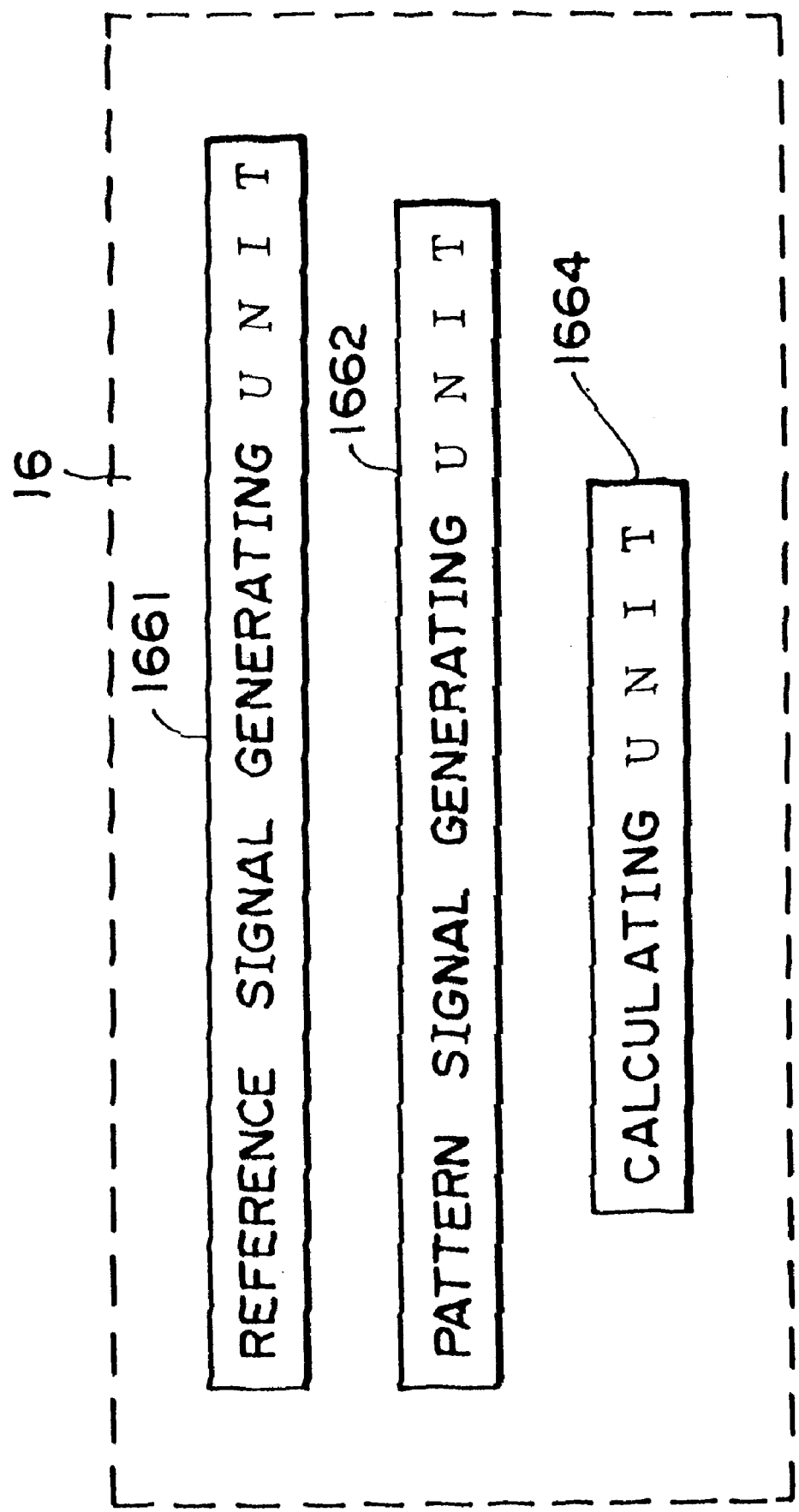
FIG. 9 is another diagram showing an arrangement of the arithmetic operation means according to the present embodiment.

The functions done by the microcomputer 166 will be described with reference to FIG. 9. The arithmetic operation means 16 is composed of a reference signal generating unit 1661, a pattern signal generating unit 1662 and a calculating unit 1664. The reference signal generating unit 1661 is utilized for generating a reference signal corresponding to the regular interval pitch p from the first light receiving element 810 and the second light receiving element 820 by means of fast Fourier transform.

The pattern signal generating unit 1662 is utilized for calculating the width of the reference signal within a range of forward half pitch amount and rear half pitch amount and forming a first pattern signal and a second pattern signal by decimating the pattern width at every three pattern elements (product detection).

The calculating unit 1664 calculates a block number containing the reference position from the number of the phase of the first pattern signal and the second pattern signal, determines a position in unit of pitch, carries out figure agreement with the phase within the pitch (Equation 2) obtained by means of fast Fourier transform, determines the position of the dark-field pattern 300 with a high precision, and calculates the shift amount of the dark-field pattern 300.

A display unit 167 is utilized for displaying the inclination angle calculated by the calculating unit 1664.

The display unit 167 may be formed of any display means such as a liquid crystal display device. Further, the display unit 167 may be arranged to output the image data to any external memory means or the like.

An inclination setting rotational laser apparatus 5000 will hereinafter be described. In the following description, the arrangements common to those of the prior art examples will not be described.

Figure 10:
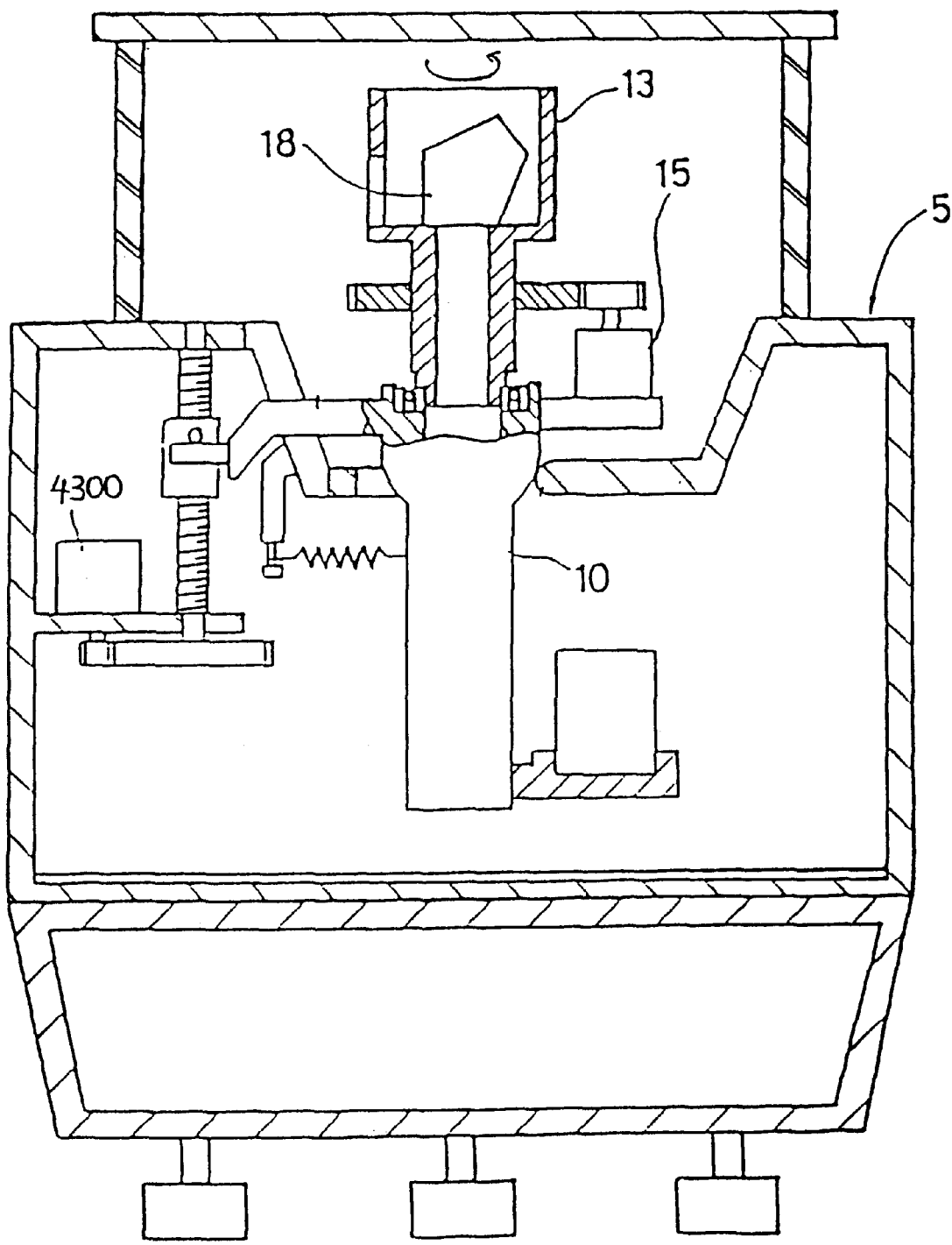
FIG. 10 is a diagram useful for explaining an inclination setting rotational laser apparatus according to the present embodiment.

As shown in FIG. 10, an inclination setting rotational laser apparatus 5000 has the laser projector 10 for generating a laser light beam provided substantially at the center of the casing 5. The inclination setting rotational laser apparatus 5000 is provided with the rotational scanning unit 13 above the laser projector 10. The rotational scanning unit 13 is arranged to be rotatable in the horizontal direction by the scanning motor 15 through a gear. T he rotational scanning unit 13 is provided with the pentaprism 18 so that the laser beam irradiate d on the rotational axis of the rotational scanning unit 13 is polarized by 90 degrees to form a laser reference plane.

The laser projector 10 is provided with the inclination sensor 1000 so that the two directions in which the inclination sensor 1000 carries out detection are coincident with the orthogonal two directions in which the laser projector 10 and the rotational scanning unit 13 can be inclined.

The inclination sensor 1000 employed in the present invention is originally a sensor for detecting position error, but the inclination sensor 1000 can detect angle with a high precision by converting the output value into an angle. The inclination sensor 1000 of the present invention is formed of a liquid surface reflection detection type for detecting inclination with high precision and also arranged to be a type in which a code pattern is projected and detected.

Further, according to the present embodiment, the pattern is skillfully arranged so that inclinations in two directions can be equivalently detected. Further, the read signal is subjected to fast Fourier transform (FFT) so that inclination can be detected with high precision regardless of the caused pattern error.

With this arrangement, it is possible to detect inclination up to about 10 degree (22%) at maximum in two directions with high precision and a wide dynamic range. Therefore, the present embodiment can offer a sufficient detection range of gradient when it is utilized in public works such as construction of a drainage system or road repairing in which measurement of several percent gradient is requested.

The inclination sensor 1000 of the present embodiment may be employed in the inclination setting rotational laser apparatus 5000 so as to make it possible to settle the inclination angle directly.

Therefore, the first inclination sensor 20, the second inclination sensor 21, the first setting inclination sensor 65, the second setting inclination sensor 66, the first arbitrary angle setting unit 52, the second arbitrary angle setting unit 53, the first drive motor 58 and the second drive motor 59 can be replaced with a single inclination sensor.

Figure 11:
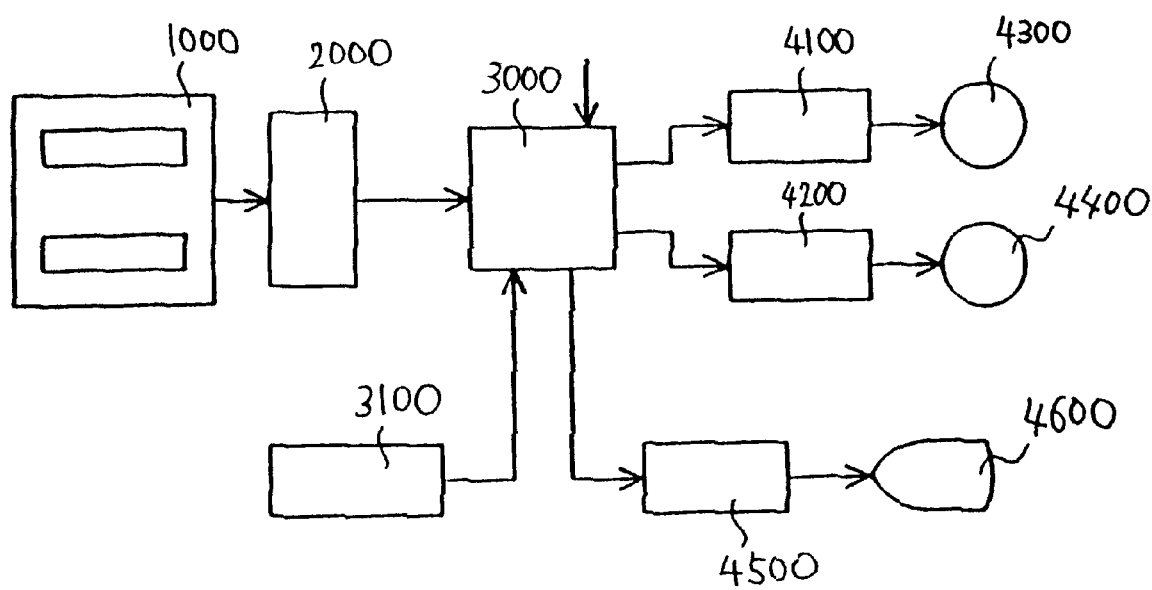
FIG. 11 is a diagram useful for explaining an electric arrangement of the inclination setting rotational laser apparatus according to the present embodiment.
Figure 12:
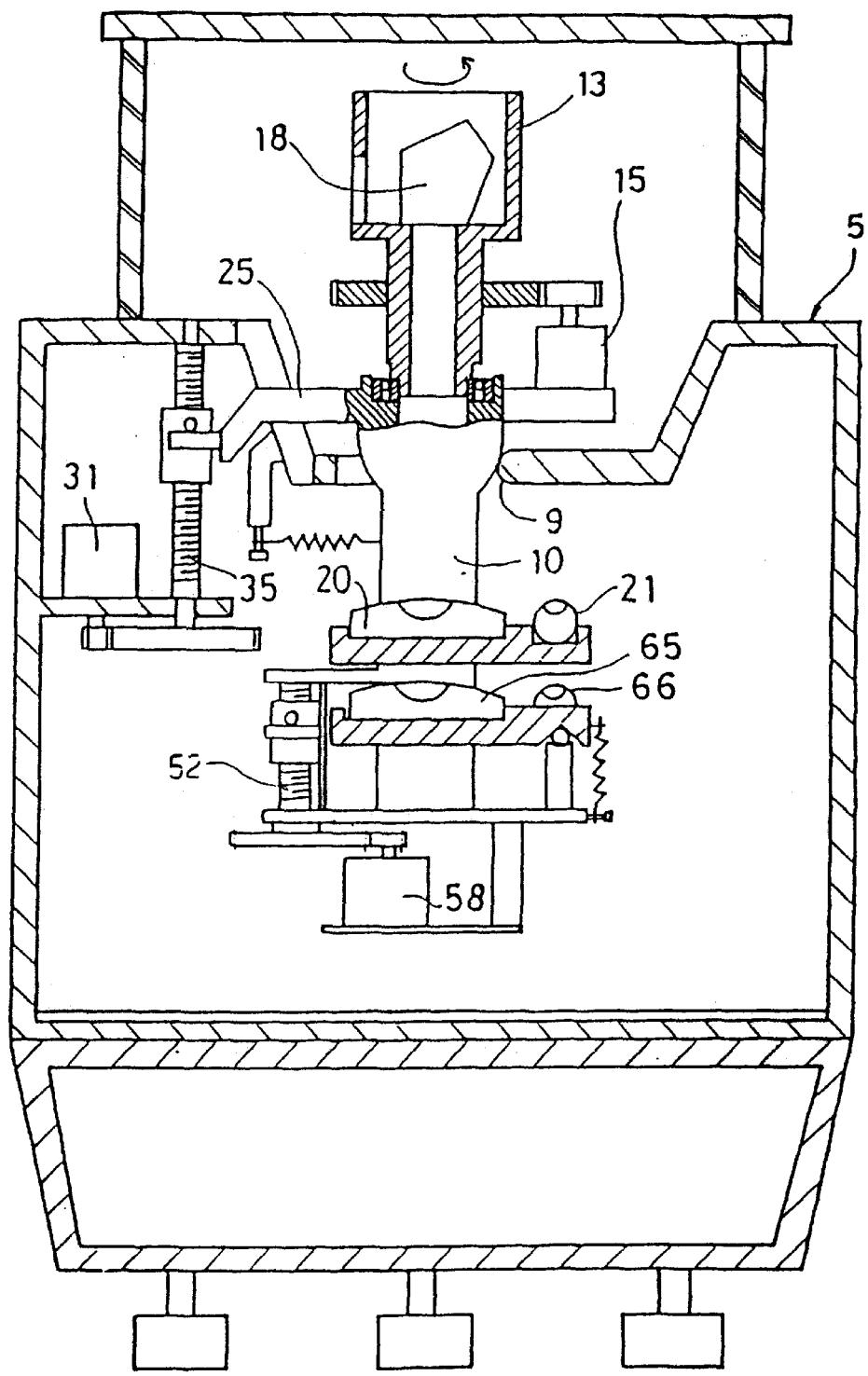
Figure 13:
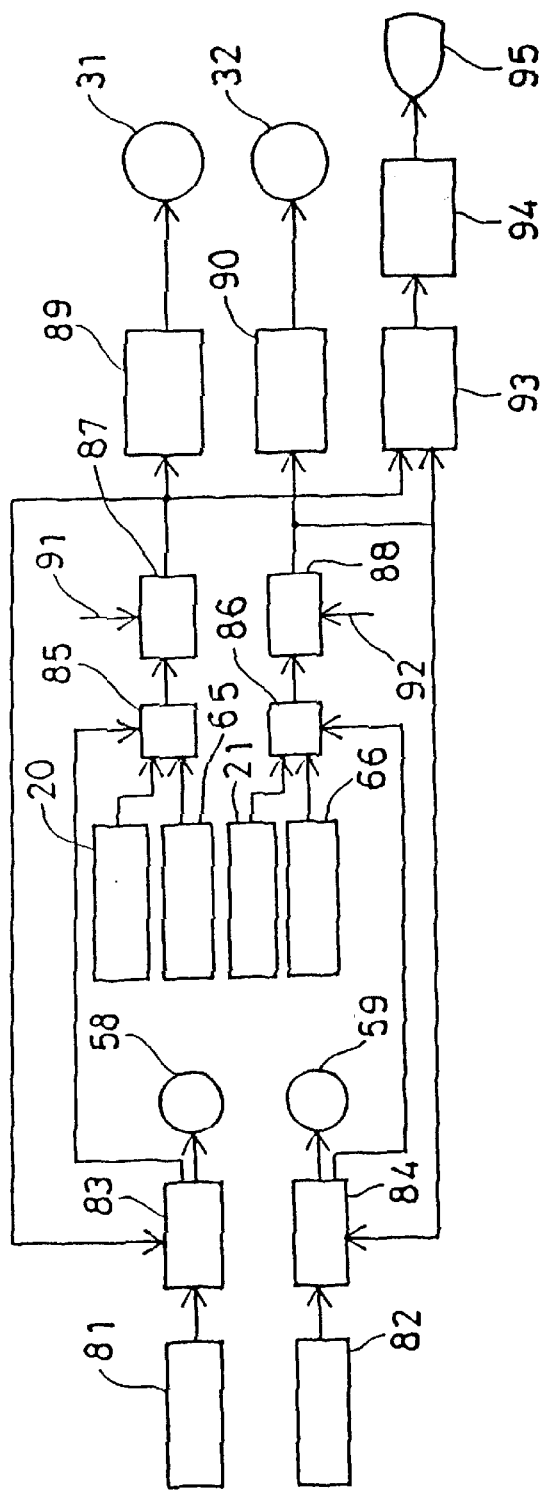

Now, how the inclination sensor 1000 carries out control will be described with reference to FIG. 11.

The output signal detected by the inclination sensor 1000, or the inclination detecting means is subjected to a processing in an inclination arithmetic operation unit 2000 to calculate the inclination angle.

The control unit 3000 supplies an output corresponding to the difference between the setting inclination angle inputted from an input unit 3100 and an inclination angle signal supplied from the inclination arithmetic operation unit 2000, to a first motor control unit 4100 and a second motor control unit 4200, so that a first inclination adjusting motor 4300 and a second inclination adjusting motor .4400 are driven. When the difference between the output signal from the inclination sensor 1000 and the signal inputted from the input unit 3100 becomes zero, it means that the laser projector 10 is settled to have a desired inclination.

A display driving unit 4500 is connected with a display unit 4600, and the display unit 4600 is capable of displaying an input angle, a gradient, the current inclination and so on.

There are two possible operations actually effected based on the control method.

One of the possible operations is that the inclination setting rotational laser apparatus 5000 is directly driven to have the inclination set by input operation from the currently inclined state so that the inclination setting rotational laser apparatus 5000 is settled to the predetermined inclination. Thereafter, a laser right beam is irradiated rotationally from the laser projector 10 to form a laser reference plane.

The other one is that leveling operation is carried out in a similar manner to the prior art, and then the inclination setting rotational laser apparatus 5000 is inclined to have the inputted inclination.

The first motor control unit 4100 corresponds to the first motor control unit 89 of the above-mentioned prior art technology while the second motor control unit 4200 corresponds to the second motor control unit 90 of the above-mentioned prior art technology.

The first inclination adjusting motor 4300 corresponds to the first level adjusting motor 31 while the second inclination adjusting motor 4400 corresponds to the second level adjusting motor 32.

The inclination arithmetic operation unit 2000 is equivalent to the arithmetic operation unit 16, or the microcomputer 166 of the above-described embodiment. The inclination arithmetic operation unit 2000 and the control unit 3000 can be realized by a common hardware chip.

According to the inclination sensor 1000 of the present invention arranged as described above, the dark-field pattern is formed into a two-dimensional pattern in which pattern elements are arrayed at a regular interval in the longitudinal directions of the first condensing element and the second condensing element, respectively, and the pattern elements are arranged to have the same width as viewed from the direction orthogonal to the direction in which the pattern elements are arrayed. Therefore, the inclination sensor 1000 has a high mechanical strength. Accordingly, it is possible to provide a compact position measuring apparatus with a high precision.

According to the present invention, if the light source and the surface of the liquid member having the free surface for reflecting the light beam from the light source are placed in a conjugate relationship, the area of reflection on the surface of the liquid member becomes the smallest, with the result that error due to the surface tension of the liquid can be made smallest. In addition, the volume of the liquid member can be made small.

Since the half mirror according to the present invention has a surface inclined relative to the light beam passing therethrough from the light source, the reflected light beam will not travel the same optical path in the opposite direction. Therefore, useless reflecting light will not be incident on the light receiving element, making it possible to achieve measurement with high precision.

Moreover, since the inclination setting rotational laser apparatus employing the inclination sensor 1000 has a high mechanical strength, a compact position measuring apparatus can be provided.

Although several embodiments have been described above, these embodiments are merely illustrative and not restrictive. Therefore, it is apparent to those skilled in the art that various changes and modifications can be effected without departing from the spirit and scope of the invention, and thus these changes or modifications should be embraced within the spirit and scope of the claims appended hereto.

Figure 15:
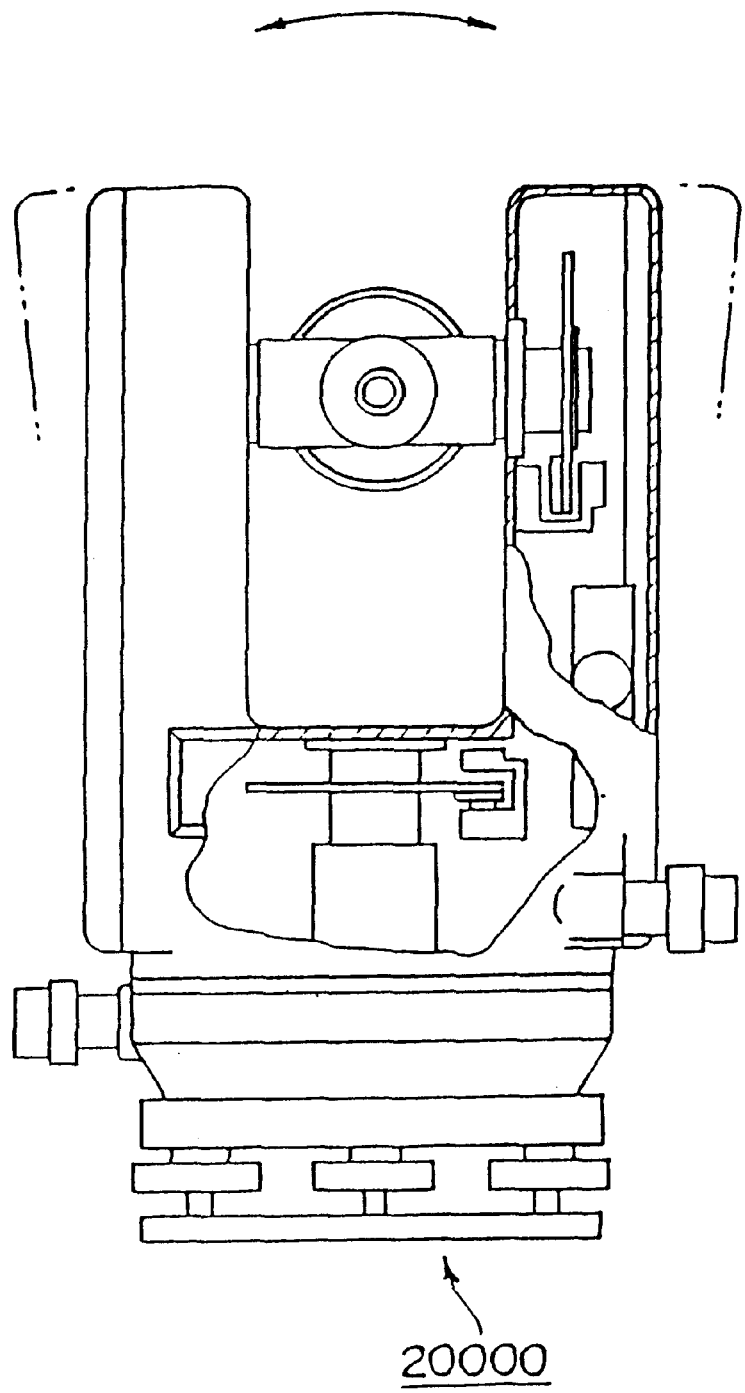
FIG. 15 is a diagarm useful for explaining the present embodiment applied to an electronic theodolite.
Figure 16:
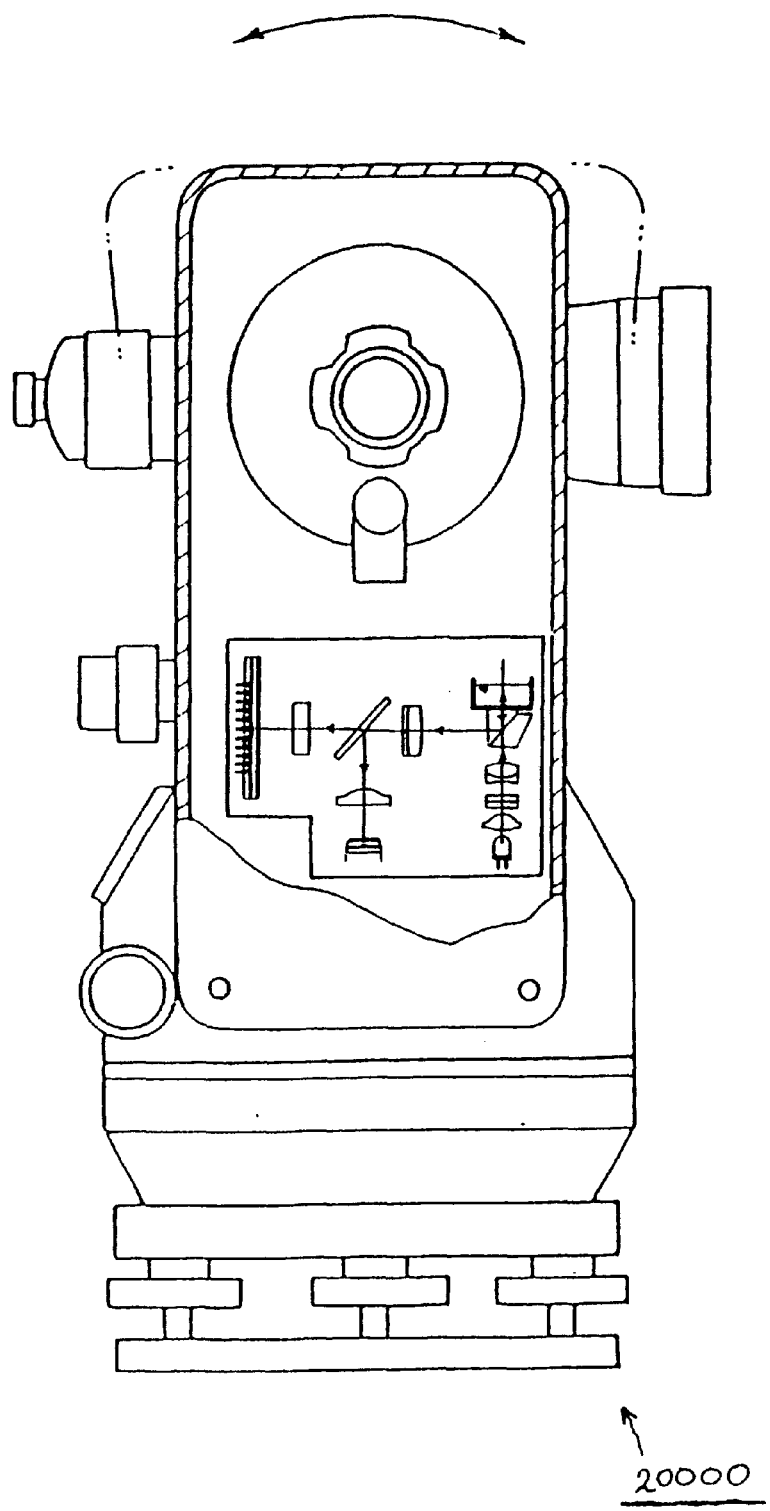
FIG. 16 is a diagram useful for explaining the present embodiment applied to an electronic theodolite.

When an inclination sensor is set to an electronic theodolite 2000 and so on as shown in FIG. 15 and FIG. 16, the inclination of X-direction and Y-direction of the surveying apparatus itself can be detected.

What is claimed is:

1. A position measuring apparatus, comprising:

a pattern arranged so as to indicate two-dimensional position;

a first optical system for splitting a light beam traveling from the pattern into two beams directed in two directions;

a first condensing element for condensing the light beam from the first optical system in a first direction;

a second condensing element for condensing the light beam from the first optical system in a second direction different from the first direction;

a first light receiving element for receiving the pattern image condensed by the first condensing element;

a second light receiving element for receiving the pattern image condensed by the second condensing element; and calculating means for calculating a position on the pattern based on light receiving signals of the first condensing element and the second condensing element;

wherein the pattern is composed of a two-dimensional pattern arrayed at a regular interval in the longitudinal directions of the respective first condensing element and second condensing element, the two-dimensional pattern arrayed in each of the longitudinal directions being arranged to have the same width as viewed from the direction perpendicular to the longitudinal direction;

and wherein the pattern is formed of at least a first pattern modulated with a first period and a second pattern modulated with a second period different from the first period in terms of each of the first and second directions, and the first pattern and the second pattern are orderly arrayed at a regular interval.

2. A position measuring apparatus according to claim 1, wherein the modulation of the first pattern and the second pattern is carried out by a spatial modulation in which the line width is varied.

3. An inclination measuring apparatus, comprising:

a light source;

a first optical system for making a light beam from the light source parallel;

a pattern having a plurality of pattern portions, the pattern portions being arrayed in an X-axis direction and a Y-axis direction perpendicular to each other;

a liquid member having a free surface on which the light beam passing through the pattern is reflected;

a second optical system for forming an image of the pattern reflected in the liquid member;

a first condensing element for condensing the image of the pattern formed by the second optical system in one of the X-direction and the Y-direction;

a second condensing element for condensing the image of the pattern formed by the second optical system in the other of the X-direction and the Y-direction;

a first light receiving element for receiving the condensed image of the pattern from the first condensing element; and a second light receiving element for receiving the condensed image of the pattern from the second condensing element; and calculating means for calculating an inclination from a reference position on the pattern based on the condensed pattern images received by the first light receiving element and the second light receiving element.

4. An inclination measuring apparatus according to claim 3, wherein the pattern comprises a two-dimensional pattern arrayed at a regular interval pitch in the longitudinal directions of the respective first condensing element and second condensing element, the two-dimensional pattern being arranged to have the same width as viewed from the direction perpendicular to the longitudinal direction.

5. An inclination measuring apparatus according to claim 3, wherein the pattern is arranged to have a constant width in terms of the X-axis direction and the Y-axis direction and orderly arrayed at a regular interval pitch.

6. An inclination measuring apparatus according to claim 3, wherein the pattern is formed of at least a first pattern modulated with a first period and a second pattern modulated with a second period different from the first period in terms of each of the X-axis and Y-axis directions, and the first pattern and the second pattern being orderly arrayed at a regular interval.

7. An inclination measuring apparatus according to claim 5, wherein the modulation of the first pattern and the second pattern is carried out by a spatial modulation in which a line width of each of the first pattern and the second pattern is varied.

8. An inclination measuring apparatus according to claim 5, wherein the pattern comprises a dark field pattern, and wherein the calculating means further comprises arithmetic operation means for calculating an inclination from a position on the dark field pattern based on the pattern images received by the first receiving element and the second receiving element, wherein the first pattern and the second pattern are formed of an absolute pattern.

9. An inclination measuring apparatus according to claim 8, wherein the arithmetic operation means calculates a motion larger than a pitch interval of the pattern based on the absolute pattern and also calculates a motion smaller than the pitch interval by calculating a phase of the pattern by means of Fourier transform, whereby the inclination is calculated.

10. An inclination measuring apparatus according to claim 8, wherein the pattern is formed of at least a first pattern modulated with a first period, a second pattern modulated with a second period different from the first period, and a uniform third pattern, the first pattern, the second pattern and the third pattern being orderly arrayed at a regular interval.

11. An inclination measuring apparatus according to claim 3, wherein the light source and the surface of the liquid member having the free surface on which the light beam passing through the pattern is reflected are in a conjugate relationship.

12. An inclination measuring apparatus according to claim 3, wherein the liquid member having the free surface is replaced with a swingable suspended member.

13. A surveying instrument having a main body and an inclination measuring apparatus according to claim 3 mounted on the main body, whereby the inclination of the surveying instrument is detected.

* * * * *